(12) United States Patent
Visser et al.

(10) Patent No.: US 10,514,082 B2
(45) Date of Patent: Dec. 24, 2019

(54) FLYWHEEL SYSTEM

(71) Applicant: S4 Energy B.V., Rotterdam (NL)

(72) Inventors: Leendert Visser, Rotterdam (NL);
Peter Teerlink, Rotterdam (NL);
Dominique Becker Hoff, The Hague (NL)

(73) Assignee: S4 Energy B.V., Rotterdam (NL)

( * ) Notice: Subject to any disclaimer, the term of this patent is extended or adjusted under 35 U.S.C. 154(b) by 0 days.

(21) Appl. No.: 16/306,311

(22) PCT Filed: Jun. 1, 2017

(86) PCT No.: PCT/NL2017/050357
§ 371 (c)(1),
(2) Date: Nov. 30, 2018

(87) PCT Pub. No.: WO2017/209612
PCT Pub. Date: Dec. 7, 2017

(65) Prior Publication Data
US 2019/0145492 A1 May 16, 2019

(30) Foreign Application Priority Data
Jun. 2, 2016 (NL) ...................................... 2016882

(51) Int. Cl.
*F16F 15/315* (2006.01)
(52) U.S. Cl.
CPC ........ *F16F 15/315* (2013.01); *F16F 2230/10* (2013.01); *F16F 2230/24* (2013.01)

(58) Field of Classification Search
CPC ...... F16F 15/30; F16F 15/315; F16F 2230/10; F16F 2230/24
USPC ................................ 74/574.4, 572.2, 572.21
See application file for complete search history.

(56) References Cited

U.S. PATENT DOCUMENTS

2004/0025625 A1 2/2004 Griswold

FOREIGN PATENT DOCUMENTS

| DE | 2049629 | 4/1972 |
|----|---------|--------|
| DE | 2050108 | 4/1972 |

*Primary Examiner* — David H Bollinger
(74) *Attorney, Agent, or Firm* — Marcus C. Dawes (57) ABSTRACT

The present disclosure relates to a flywheel system (1), comprising a ring-shaped flywheel rotor (3), arranged on a rotation axis (7); and a substantially cylindrical casing (2), enveloping the flywheel rotor (3) at least in a radial direction to contain the flywheel (3) in case of a calamity. The flywheel system (1) further exhibits the feature that the casing (2) comprises and having at least one inward protruding bumper (8) defining a variation from the circular shape in cross section of the casing wall (5) surrounding the flywheel rotor (3). The casing wall (5) may itself be circular and the bumper (8) can define a deviation relative to the circular shape thereof, to enhance deceleration of the flywheel rotor (3), if, in case of an accident or calamity, the flywheel rotor (3) comes loose.

15 Claims, 10 Drawing Sheets

FLYWHEEL SYSTEM

The present disclosure relates to a flywheel system. Conventionally, a larger sized flywheel system may comprise: a ring-shaped flywheel rotor, arranged on a rotation axis; and a substantially cylindrical casing, enveloping the flywheel rotor at least in a radial direction to contain the flywheel in case of a calamity. The casing is herein intended to restrict or confine the flywheel rotor in case of an emergency, such as failure of the rotation axis, a bearing and/or parts and components assembled with the flywheel rotor.

Conventionally, such a casing comprises a circular wall intended to retain the flywheel rotor within the confines defined thereby. In case of such an emergency, for example parts failure, the flywheel rotor may stop to rotate on its own, and start to roll over the casing wall. In an emergency, wherein the flywheel rotor starts to touch the casing wall after a failure of the bearing or rotor assembly, the flywheel rotor may be free to move in axial and radial direction when one or more of these parts or components fail.

If the rotor can move unrestricted inside the casing, rotation of the rotor will be converted into a rolling motion by the friction between the rotor and casing. Initially, centrifugal and friction forces slowly increase, but in a previously unexpected manner thereafter an uncontrolled increase of the rolling effect and resulting forces quickly follows. This exponential or faster increase in rolling speed and associated forces on the casing and more in particular on the casing wall lead to heavy loads and vibrations on entire construction (rotor, casing, foundation) and ultimately catastrophic failure. In this respect it is noted, that the present disclosure relates to flywheel rotors having for example or preferably, though not exclusively: an outer radius in radial direction of at least 0.85 meter, preferably at least 1 meter, and more preferably at least 1.30 meter; a thickness in axial direction of at least 0.20 or 30 meter, preferably at least 0.45 meter, and more preferably at least 0.60 meter; and a weight of at least 2.5 tons, preferably at least 4 tons and more preferably at least 5 tons. At such dimensions, it is evident that the effects of a flywheel turned the loose at a rotational speed of for example at least 600 rpm and sometimes even up to 1800 rpm will have catastrophic effects, already at the first bump against a fortified casing wall. It is noted that these dimensions and parameters are merely exemplary of the enormous type of flywheel rotor, to which the present disclosure may relate.

It is acknowledged here that US-2004/025625 discloses a casing having an inner wall surrounding a flywheel, with a perfectly cylindrical liner and energy absorbing restraint ribs between inside of the casing's inner wall. Although some damping might be expected from the liner and energy absorbing restraint ribs, these measures are ineffective to combat the rotational upswing of the rotor in case of a calamity, where the rotor breaks free. Also, reference is made to DE-2050108, which discloses an air discharge and associated air flow guide plate, defining a deviation from a perfectly cylindrical shape (circular in cross section), but wherein the discharge and flow plate do not contribute at all to combating the effects of a calamity. Finally, reference is made here to DE-2049629, which discloses a flywheel arranged upright to rotate around a horizontal axis, without a casing, where brakes are arranged under the flywheel to reduce rotational speed in case the flywheel comes loose from its axis.

As a logical solution skilled people in the relevant field would contemplate further fortification of the casing and possibly the provision of a braking system. Further fortification of the casing will, however, only unexpectedly aggravate the effects of the flywheel on the loose, as the flywheel may enter into a self accelerating natural frequency type of rotational mode, and accelerate out of control.

According to the present disclosure, in deviation from the most logical solution expected to be conceived of by current day skilled people, the flywheel system exhibits the feature that the casing, enveloping the flywheel rotor at least in a radial direction, comprises at least one inward protruding bumper defining a variation from the circular shape in cross section (the cylindrical shape) of the casing wall surrounding the flywheel rotor. As an effect of the non-circular shape of the casing wall, the upswing of the flywheel rotor into an natural frequency or self-accelerating state is disrupted, and acceleration in an exponential or faster manner is prevented or at least substantially reduced, to allow control over the flywheel even in case of otherwise catastrophic release of the flywheel into an natural frequency mode of self-acceleration. Moreover, and as a further unexpected beneficial effect or advantage, wobble motion of the rotating flywheel rotor on the loose (fluctuation in the direction of the rotation axis) is damped.

The provision of a bumper to restrain the flywheel in case of a calamity is utterly against the natural inclination of the skilled person, since in the mind of the skilled person impacts of the flywheel on the casing should always have been prevented as much as possible. Quite in contrast, the present disclosure relies on the purposeful provision of bumpers for impact of the flywheel thereon in case of calamity, in order to disrupt the rotational movement of the flywheel and prevent the flywheel from rotating in a natural or eigen frequency based rotational state.

The present disclosure, through the appended claims defining the scope of embodiments disclosed herein, encompasses many more or less preferred embodiments, some of which are described in the below embodiment description, and some of which may be particularly defined in dependent claims.

In a preferred embodiment a flywheel system according to the present disclosure may exhibit the feature that the casing wall comprises at least one inward protruding bumper, preferably at least two bumpers, and more preferably at least three bumpers. Such a bumper can be considered a specific type of deviation from a circular casing wall, which may suffice to prevent a flywheel rotor turned loose from causing catastrophic effects on the system as a whole.

Additionally it is noted that a configuration of three bumpers, defining three stop or buffer points for the flywheel rotor to intentionally bump against, provides a very effective enclosure for the flywheel rotor; there is no part of the casing wall, where the flywheel rotor can pass between the bumpers in the form of protrusions, stops or buffers, if the diameter of the flywheel rotor is larger than the direct circumferential distance between neighbouring bumpers.

In a preferred embodiment having at least two or more preferably at least three bumpers formed for example by protrusions, stops or buffer points, preferably the flywheel system also exhibits a feature that the inward protruding bumpers are uniformly distributed over the casing wall, in particular over the inner circumference thereof. Consequently, uniform distribution of impact forces over the circumference of the casing and the casing wall may be achieved.

In any embodiment having at least one bumper, preferably the at least one bumper defines a discontinuity in the tangential direction of the casing wall, deviating from a change in tangential direction of a circular shape. Thereby, a flywheel rotor turned loose will, when rolling over the inner casing wall, be repeatedly nudged towards a centre position, lowering the flywheel rotor's energy and surprisingly also lowering contact impact forces quickly and efficiently. This effect is already achieved using slight discontinuities relative to a circular or cylindrical shape of the casing wall.

In any embodiment having at least one bumper, preferably the at least one inward protruding bumper protrudes inward towards the flywheel rotor relative to adjoining portions of the casing wall.

In any embodiment having at least one bumper, preferably, in a rotational direction of the flywheel rotor, the casing wall exhibits an approximately circular curvature in cross section (the wall is cylindrical) with a radius, which is at least slightly larger than a radius of the flywheel rotor. This allows the flywheel rotor to roll over the casing inner wall over a short distance, before being nudged towards the centre by a bumper defined by a deviation from the circular shape of the casing inner wall.

In any embodiment, regardless of whether the non-circular nature of the casing wall is achieved by one or more protrusions, stops, and buffers, an oval or other shape of the casing's inner wall or the like, the flywheel system may exhibit additionally or alternatively the feature that the casing comprises reinforcement of the casing wall. A mere non-circular shape of the casing wall will contribute to a large extent to being able to maintain control over the flywheel rotor, even in case of an emergency, but the inner wall can be embodied relatively light when reinforced at appropriate locations around the circumference thereof.

The reinforcement may comprise a backing at the at least one inward protruding bumper. The most effective and efficient reinforcement may be achieved in this manner, as the bumper formed by protrusions, stops, buffers or otherwise are designed to be hit by the flywheel rotor on the loose, and can consequently be most effectively reinforced using the backing, where at other locations such a backing may be omitted or provided in a less sturdy embodiment.

Further a flywheel system according to the present disclosure may exhibit the feature of a brake, which is configured to, when activated, act on at least the flywheel rotor to slow down the flywheel rotor in case of emergency. Such a brake may contribute reducing the rotational speed of the flywheel rotor, after having come loose, but will only function thanks to wobble motion suppression achieved by the non-circular shape or nature of the casing wall in general and preferably axially extending protrusions, stops or buffers.

Further a flywheel system according to the present disclosure may exhibit the feature of a drive and/or a power generator connected to the flywheel rotor.

Further a flywheel system according to the present disclosure may exhibit the feature that the casing wall comprises either a ring shaped or cylindrical wall or a disc shaped base, which is clamped with a degree of play in a concentric configuration with the fly wheel, to absorb impact energy when the fly wheel impacts on the casing wall. This is considered an invention uin its own right, even having embodiments without at least one inward protruding bumper relative to the otherwise (except for the bumpers) potentially perfectly cylindrical or circular (in cross section) casing wall.

The flywheel system according to the present disclosure exhibits the feature that the casing wall is itself circular (i.e. cylindrical) and comprises at least one bumper defining a deviation from the circular shape of the casing wall.

Further a flywheel system according to the present disclosure may exhibit the feature that the bumper comprises at least one straight plate arranged at a circle section relative to the circular shape of the casing wall, alongside an enveloping circular or cylindrical shape circumscribing the flywheel rotor.

Further a flywheel system according to the present disclosure may exhibit the feature that the casing wall comprises at least one front plate, defining a deviation relative to the circular shape of the casing wall and an impact absorbing bumper. In such an embodiment the front plate may be made of a softer material than that of the fly wheel and/or has a lower melting temperature than that of the fly wheel. In an embedment having the front plate, the front plate may be coated with a friction reducing coating.

Further a flywheel system according to the present disclosure may exhibit the feature that the casing wall comprises at least one bumper, comprising an assembly of plates. In such an embodiment the assembly may comprise at least two of: a backing plate connected to or integral with the casing wall; a brass front plate; a glass fibre layer; and a base plate.

More and other feature of embodiments of a flywheel system according to the present disclosure may become apparent from the following embodiment description, in which reference is made to the appended drawing of preferred embodiments, and wherein similar or the same elements, components and features in distinct embodiments may be referenced using identical reference signs in as far as the function thereof is essentially the same in all embodiments. Further, the shown and described embodiments are merely provided as examples of possible manners of implementing the present disclosure, but a scope of protection according to the appended claims is by no means to be interpreted as limited to any of the features in the following embodiment description, even if no alternative is described or shown; only the scope of the appended independent claim is determinative of the scope of protection for the present disclosure, and may even include as yet before filing the present disclosure unforeseen alternatives for specifically defined features. In the drawing:

Figure 1:
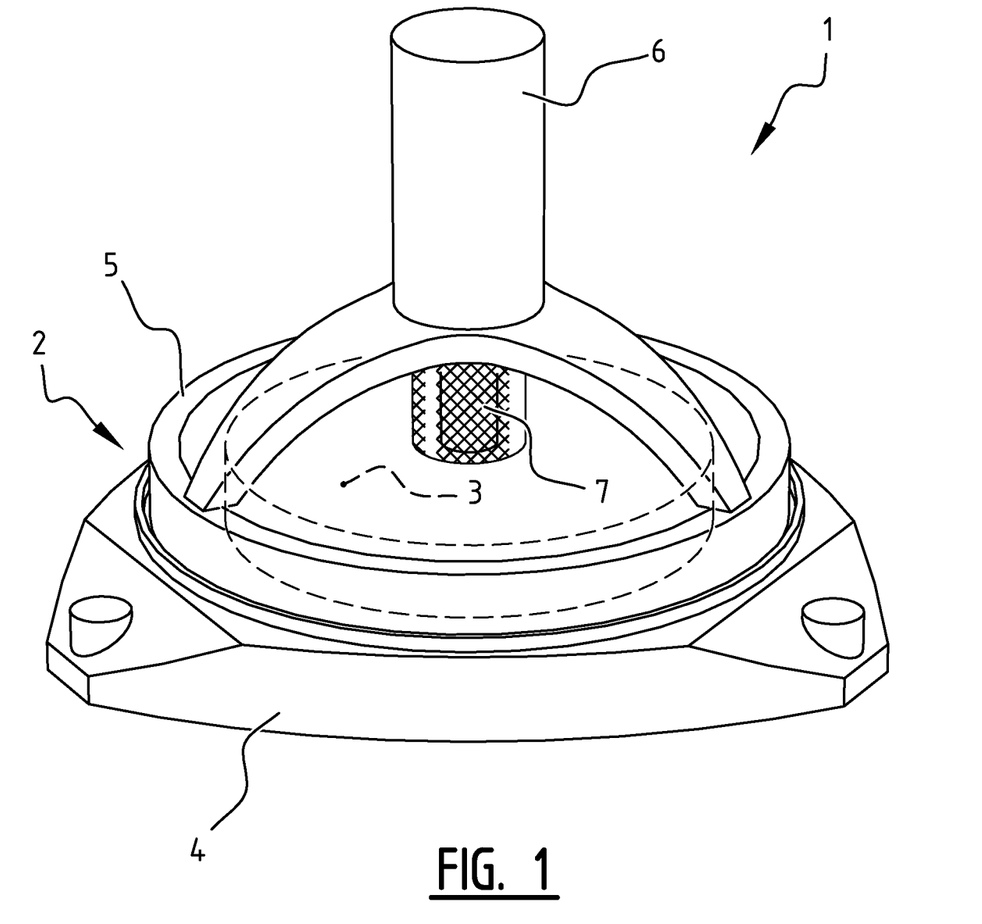
FIG. 1 shows a schematic perspective view of a flywheel system in an embodiment according to the present disclosure.

FIG. 1 shows a schematic perspective representation of a three protrusion based flywheel system 1, having a casing 2, comprising a base 4 and a casing wall 5, and a disk or ring shaped flywheel rotor 3. The flywheel rotor is big; it generates enormous forces and unleashes tremendous powers, when it should break free from a bearing or from the rotation axis 7, connecting the flywheel rotor 3 to an energy storing drive or energy withdrawing generator, referred to as drive/generator 6.

Figure 2A:
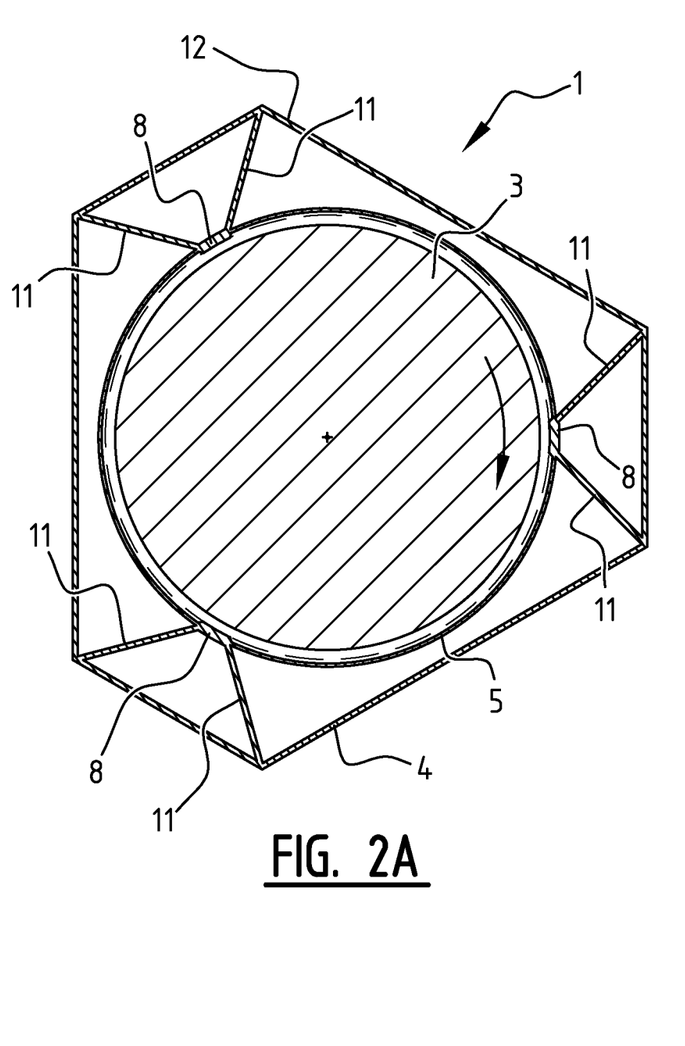
FIGS. 2A and 2B exhibit a top view of a three protrusion based flywheel system in a normal operational state and wherein the flywheel rotor is turned loose to roll over an inner wall of a casing.
Figure 2B:
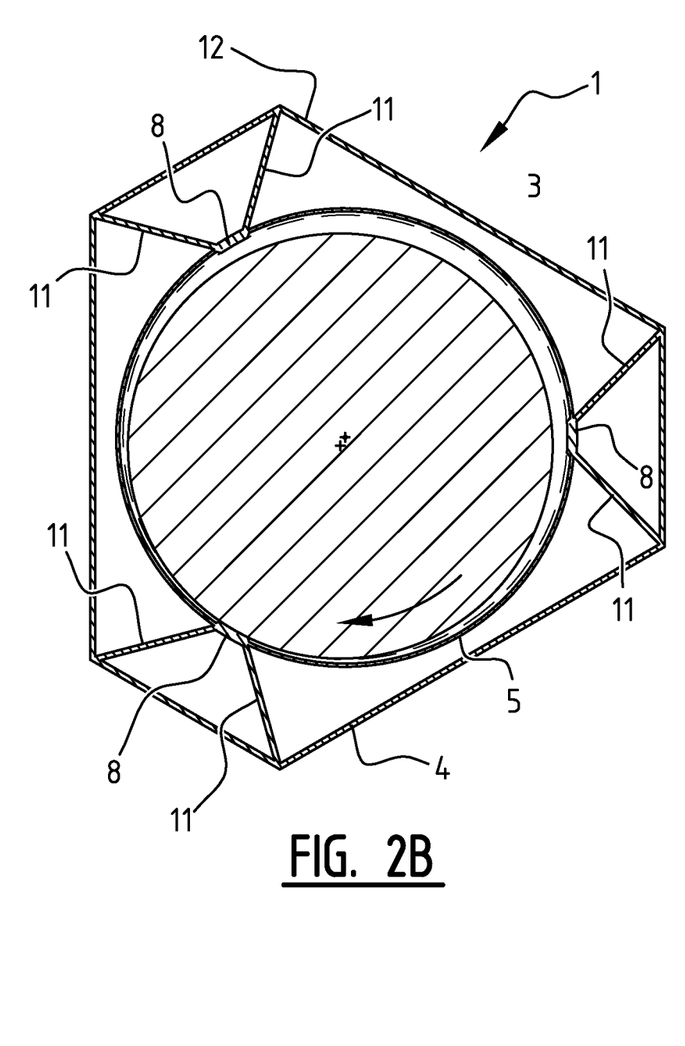

The embodiment of FIGS. 2A and 2B most closely resembles the embodiment of FIG. 1, in terms of the number of protrusions. In this embodiment, three bumpers 8 defining the protrusions are provided in a manner evenly or uniformly distributed around the flywheel rotor 3. As long as the flywheel rotor is in the state of FIG. 2A, all is well.

However, when the flywheel rotor 3 breaks free, as in FIG. 2B, it will begin to roll along inner surface of casing wall 5 and may start to wobble as well, i.e. up and down relative to the plane of the drawing of FIGS. 2A and 2B. The bumpers 8 define protrusions and more generically a deviation from a circular inner surface of the casing wall 5 in the sense of the present disclosure. At each impact of flywheel 3 on such a bumper 8, the flywheel is nudged towards the middle of the casing wall and is centred as a consequence. The bumpers 8 extend in an axial direction of the rotation axis 7 of the system 1. Consequently, when the flywheel 3, after having broken loose, begins to skew and consequently wobble, the relative orientation of the outer surface of the flywheel rotor 3 and the elongate bumpers 8 results in levelling of the flywheel rotor 3. A situation can thereby be effectively prevented, wherein the flywheel rotor can get instantaneously stuck in the casing 2 due to an oblique position of the flywheel rotor 3, having a very abrupt halt of the rotor 3 with explosive effects as a consequence.

Figure 1A:
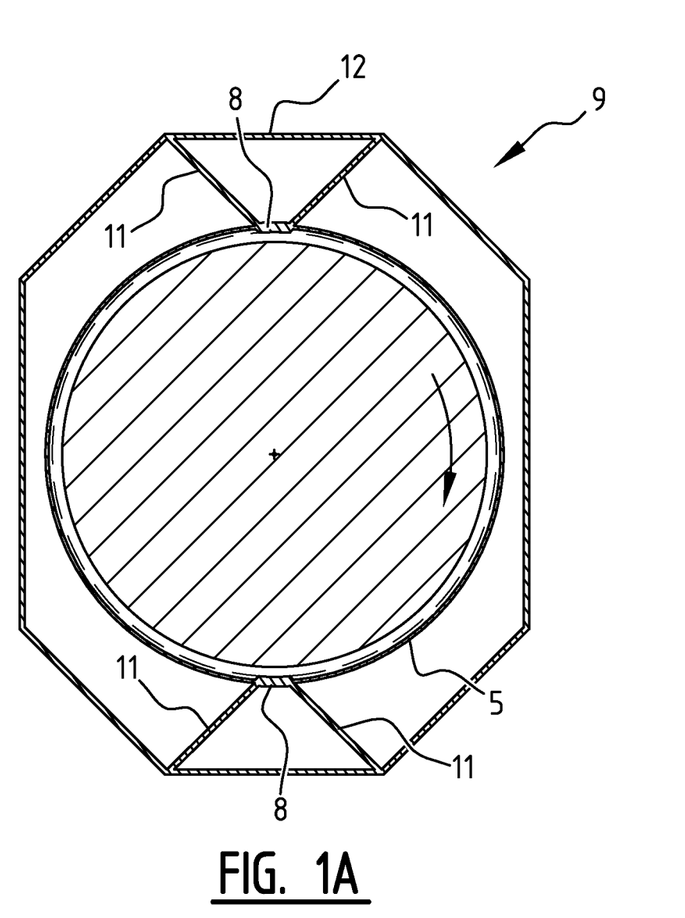
FIGS. 1A and 1B exhibit a top view of a two protrusion based flywheel system in a normal operational state and wherein the flywheel rotor is turned loose to roll over an inner wall of a casing.
Figure 1B:
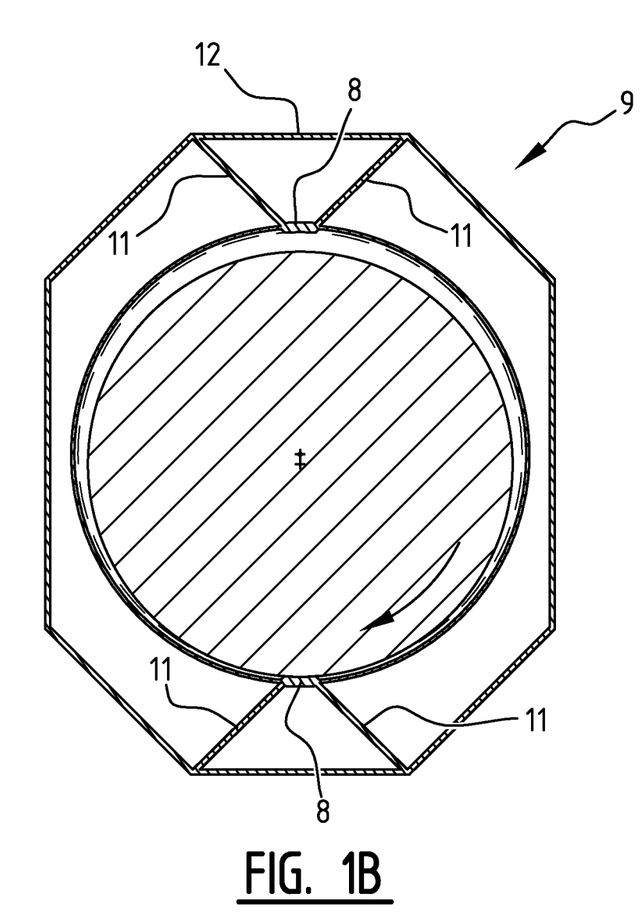
Figure 3A:
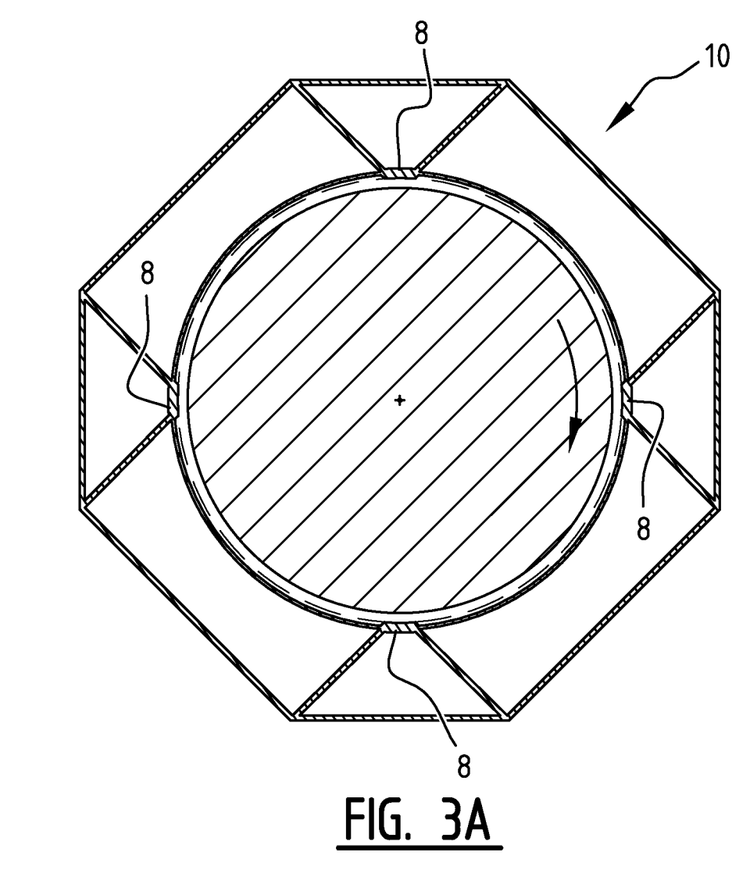
FIGS. 3A and 3B exhibit a top view of a four protrusion based flywheel system in a normal operational state and wherein the flywheel rotor is turned loose to roll over an inner wall of a casing.
Figure 3B:
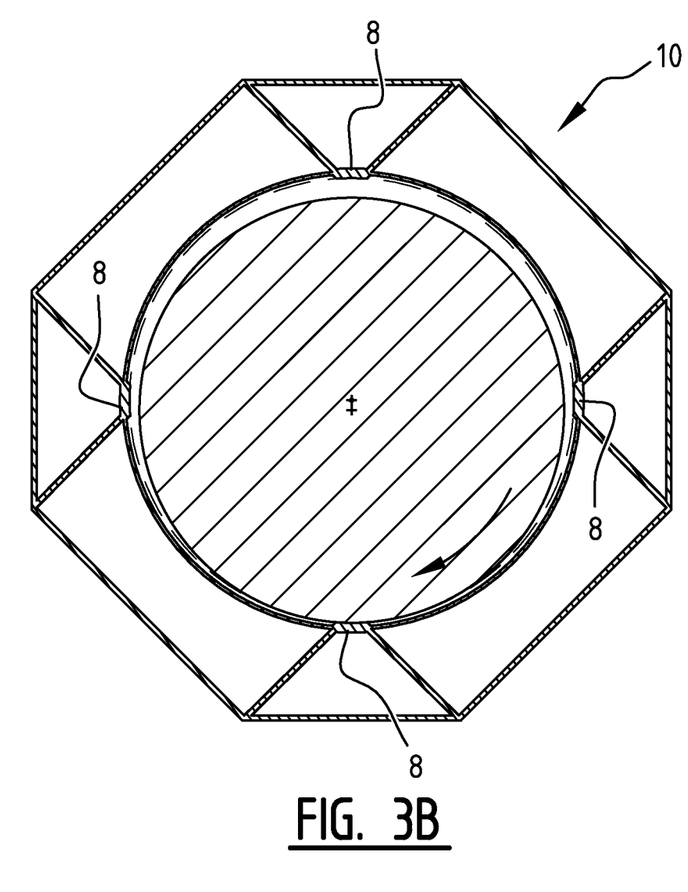

FIGS. 1A and 1B are essentially the same as the configuration according to FIGS. 2A and 2B, except that in FIGS. 1A and 1B the system 9 comprises two bumpers 8 defining protrusions. Again, the bumpers 8 are uniformly distributed, although another distribution may well be contemplated, also relative to the configurations of FIGS. 2A, 2B, 3A, and 3B. FIGS. 3A and 3B are also essentially the same except for the presence in that system 10 of four bumpers 8.

Figure 7:
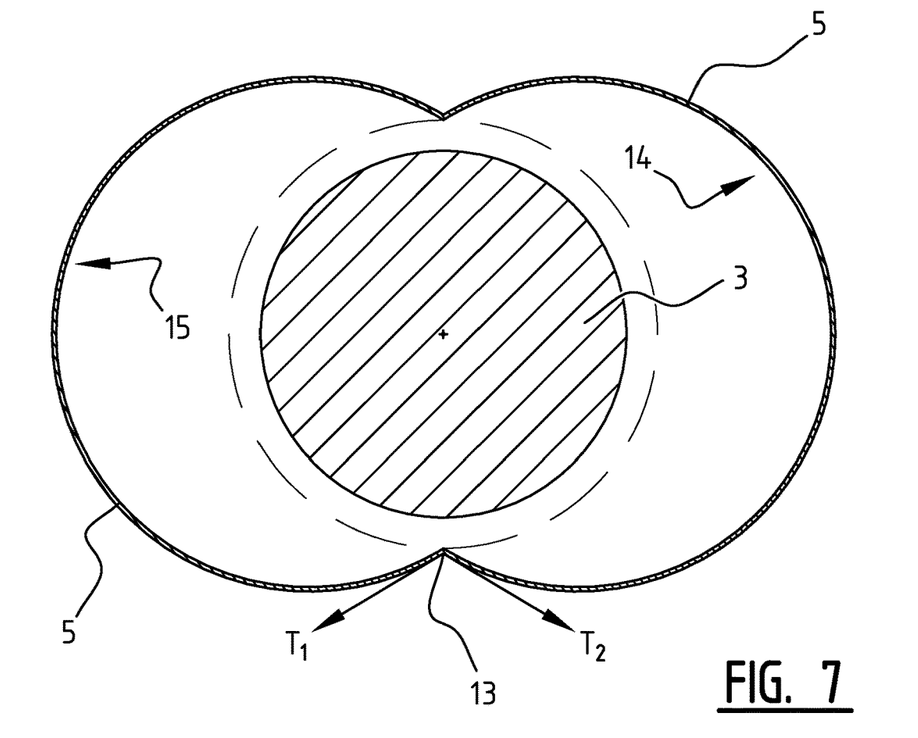
FIG. 7 exhibits a schematic representation of an alternative for the configuration in FIGS. 1A and 1B.

FIG. 7 exhibits a slightly different embodiment than FIGS. 1A and 1B in an exaggerated representation. The embodiment distinguishes in that the protrusion is formed at a transition area or transition point 13, where two circle shapes 14, 15 meet, from which the inner surface of casing wall 5 is formed. The representation is exaggerated in that the rotor could spin inside one of these circles or pass along an 8-shaped trajectory, but the point of the embodiment is the shape at the transitional point, where the circular shapes 14, 15 meet and define a discontinuous transition in tangential directions T1 and T2.

Figure 8:
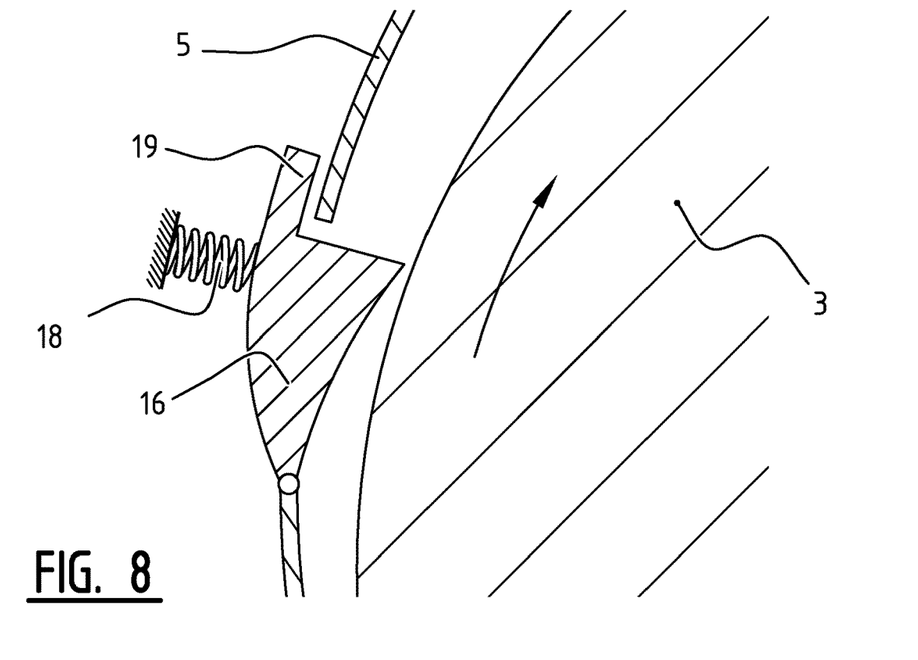
FIG. 8 shows an exaggerated representation of a further embodiment, wherein the non-circular shape of the inner surface of the casing wall is configured from two offset circles, each having a larger diameter than the flywheel rotor

FIG. 8 shows yet another embodiment with respect to the protrusion defined therein. Here, an essentially triangular swivel block 16 is arranged at hinge 17 on inner surface of casing wall 5. A leg 19 prevents the swivel block 16 from extending too far towards the flywheel rotor 3. A spring 18 or another deflection motion absorbing element is provided radially behind the swivel block 16, and pushes swivel block 16 inward towards the flywheel rotor 3. When the flywheel rotor 3 is on the loose, and rolls over the inner surface of the casing wall 5, swivel block 16 is pressed out against a reactions force from the spring 18, which spring force is responsible for nudging the flywheel 3 back to the centre of the casing. Also, the spring absorbs energy through deflection of the swivel block 16, contributing to a quicker speed reduction.

Each bumper 8 in FIGS. 1A, 1B, 2A, 2B, 3A, and 3B is provided with oblique backing members 11, enclosed in a frame 12. Thereby specifically the bumpers may be reinforced to withstand the forces unleashed thereon when the flywheel rotor breaks free from its bearings, or from rotation axis 7 or the like.

Figure 4:
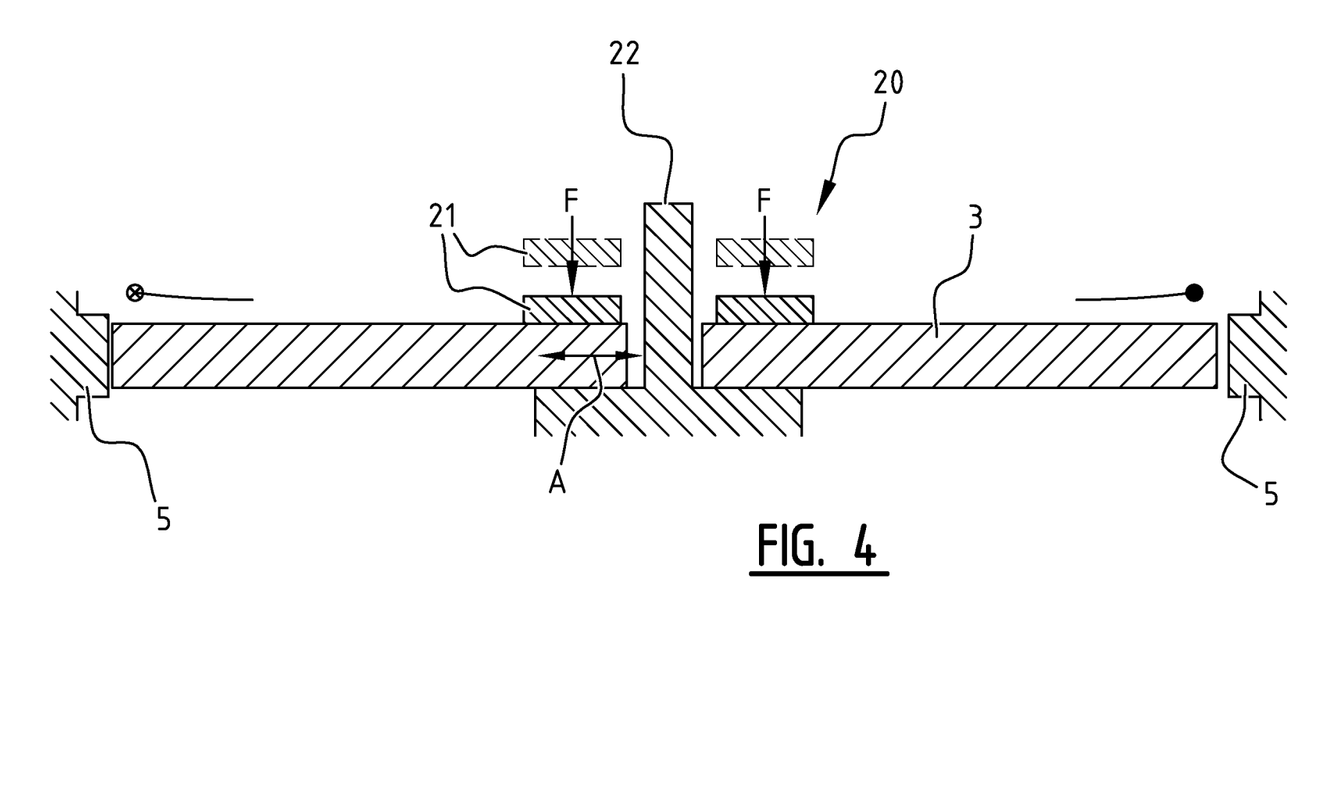
FIG. 4 exhibits a side sectional view of a detail of an embodiment comprising a brake.

FIG. 4 shows further features related to a brake 20. Brake 20 is arranged near the centre of the flywheel rotor for two reasons:

the linear speed of the flywheel rotor is lower at the centre of the flywheel rotor than at a circumferential edge of the flywheel rotor 3. Especially at high rotational speeds of up to or higher than 1800 rpm at a radius of a meter or more, and a weight of 5 tons or more, any brake at the outer diameter of the flywheel rotor 3 would burn out practically immediately after deployment thereof;

even though elongate embodiment of protrusions may serve surprisingly to combat wobble motion of the flywheel rotor 3, any such wobble motion would be most pronounced at the outer diameter of the flywheel rotor 3, reducing the effectiveness—if any—of a brake at the circumference of the flywheel rotor 3, also at lower rotational speeds and smaller dimensions of the flywheel rotor then referred to immediately above.

The brake may schematically comprise a disk to be clamped with force F onto a top surface of the flywheel disk 3, after that flywheel 3 has started to spin out of control, as indicated with double arrow A, to toll over inner surface of casing wall 5. Alternatively, brake elements (not shown) may be projected from the axis 22, around which the flywheel rotor 3 revolves, or from the inner surface of casing wall 5, or the like.

Figure 9:
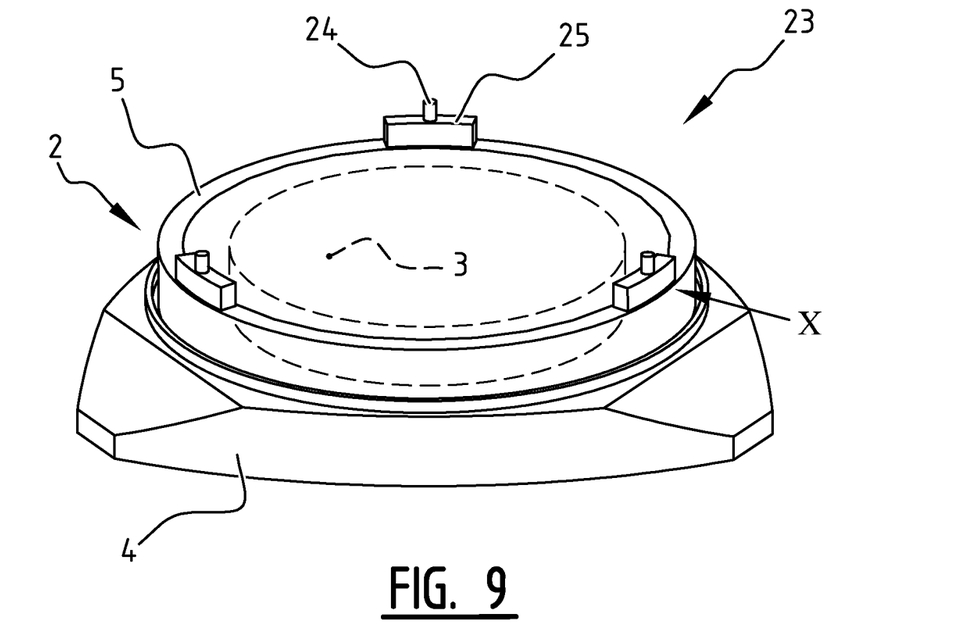
FIG. 9 shows a perspective view of a further embodiment of a flywheel system.
Figure 10:
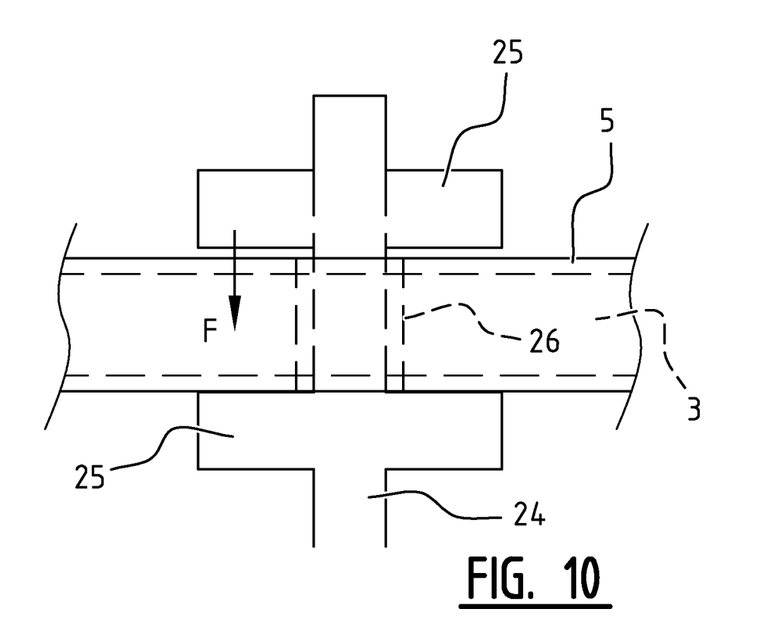
FIG. 10 is a view along the arrow X in FIG. 9.

FIGS. 9 and 10 show a manner in which casing wall 5 or a base 4 can be clamped with a limited degree of play, to absorb energy in case of a collision of the flywheel 3 there against. Uprights or anchors 24 form structural components, which are anchored to a ground or basis (not shown). The uprights or anchors 24 extend along or through the casing wall 5 or base 4. In the configuration of FIG. 10 the casing wall 5 has the form of a ring, arranged on base 4. In an embodiment with the ring shaped wall 5 fixed to the base 4 or without a separate ring shaped wall 5, base 4 may be anchored to the ground, a floor or the basis (not shown). In particular, the uprights or anchors 24 may then be positioned in or at bevelled extremities of base 4, shown in FIGS. 1 and 9.

The uprights or anchors 24 extend through casing wall 5 or base 4, through a hole 26 in casing wall 5 or base 4, which is dimensioned to be larger than the diameter of the uprights 24. This way, the ring shaped casing wall 5 or base 4 is able to be displaced over a limited distance from the original arrangement thereof, in which original placement the casing wall 5 or base 4 is concentric with fly wheel 3.

Clamping blocks 25 are arranged under and above the casing wall 5 or base 4, and exert a clamping force F on the ring shaped casing wall 5 or base 4. When the fly wheel 3 comes loose, for whatever reason, it is likely to impact on the casing wall 5 or base 4, which is thus designed to give way over a small distance, corresponding with the over dimensioning of hole 26 relative to the diameter of upright 24. The clamping blocks 25 thus dampen this displacement of the ring shaped casing wall 5 or base 4, whereby more quickly impact energy is absorbed.

Lower clamping blocks 25 may be formed by an upper surface of base 4 in an embodiment having the ring shaped wall 5. Upper clamping blocks 25 may be connected to any element or component, or even attached or integral with the uprights, in order to generate a desired or required clamping and damping force F on the casing wall 5 or base 4.

Figure 11:
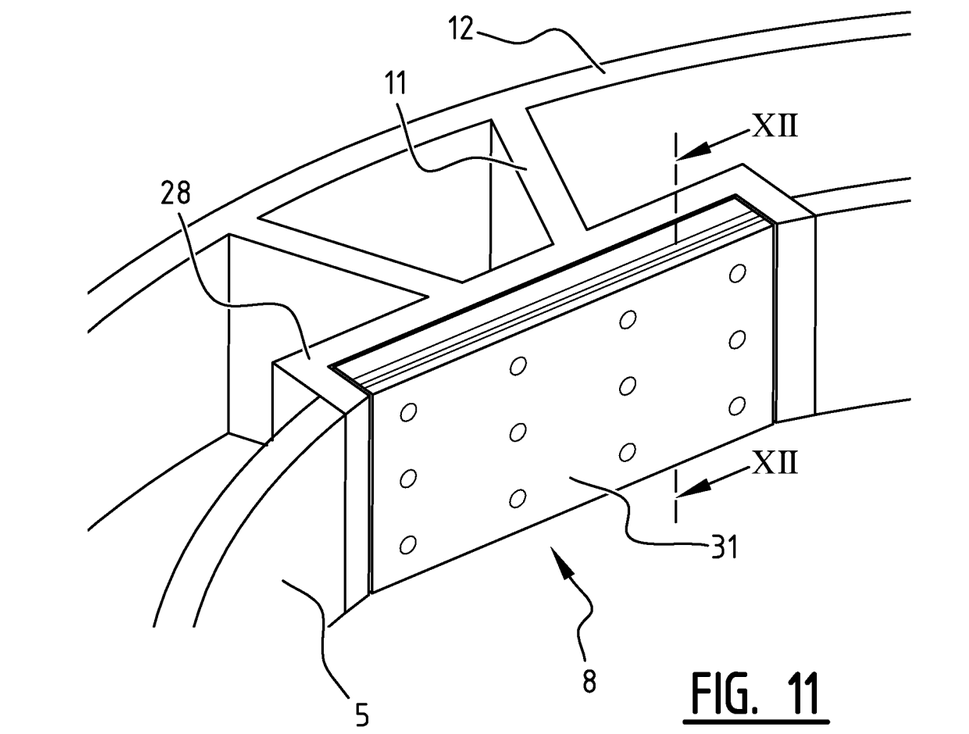
FIG. 11 shows an exemplary embodiment of a bumper in or for an arbitrary flywheel system.
Figure 12:
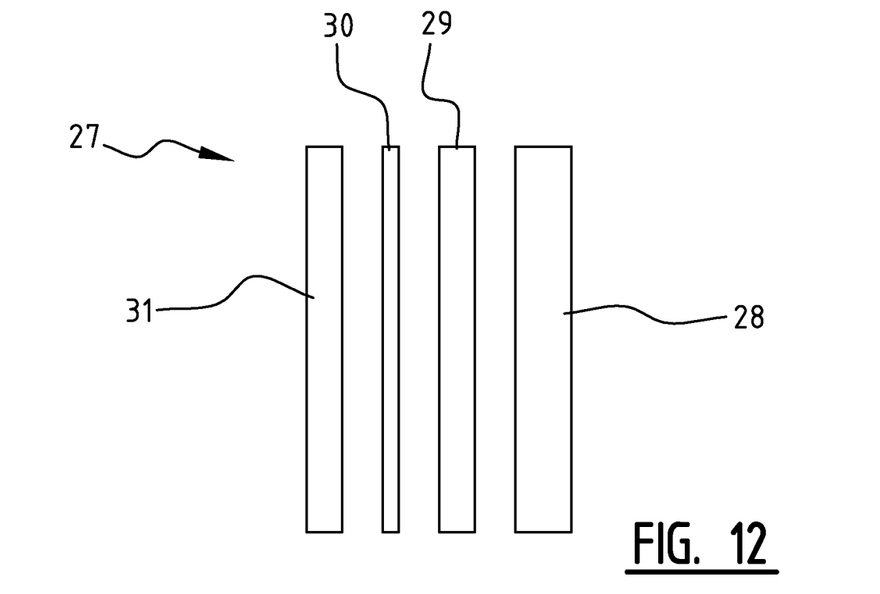
FIG. 12 shows a cross sectional side view along the lines XII-XII of the bumper in FIG. 11.

FIGS. 11 and 12 show yet another embodiment of a bumper 8, defining a deformation of the casing wall 5 relative to a perfectly circular shape thereof. The bumper 8 in this embodiment comprises a backing 28, forming part of or rigidly connected to the casing wall 5. The backing 28 defines an accommodation for an assembly of a brass or copper front plate 31, an intermediate glass fibre layer 30 for isolation and a base plate 29. The feature of a brass front plate allow the material of the front plate to absorb some impact energy through deformation thereof, since brass is a relatively soft metal. All of the elements 28-31 are straight plates and consequently the front surface of the brass plate in a top view defines a section of the circular shape of the casing wall 5 and a protrusion into the interior of this circular shape. Together, the bumpers 8 allow sufficient room for the fly wheel 3 to rotate in a normal operational state. When the fly wheel brakes loose, the bumpers 8 define controlled points of impact into which the why wheel 3 bumps to lose energy and lose speed.

Alternatively, the front plate 31 can be made of cast iron, in which case the intermediate glass fibre layer 30 for isolation and a base plate 29 may—in some embodiments— be omitted, depending on the actually selected material of the front plate 31.

Alternative material than copper or brass may also prove to be suitable. The objectives for choosing copper, brass and/or cast iron relate to the material having a lower melting temperature and/or being softer than the fly wheel 3, so that upon impact the fly wheel doesn't rip into the front plate 31.

The front plate, in any embodiment having or not intermediate glass fibre layer 30 for isolation and base plate 29, may also be provided with a friction lowering coating from plastic, such as teflon, nylon, UHMWPE, and the like, or any other suitable material, to promote that the fly wheel 3 skids off bumper 8 at impact there against, in view of friction reducing properties of such a coating on the front plate.

Figure 5:
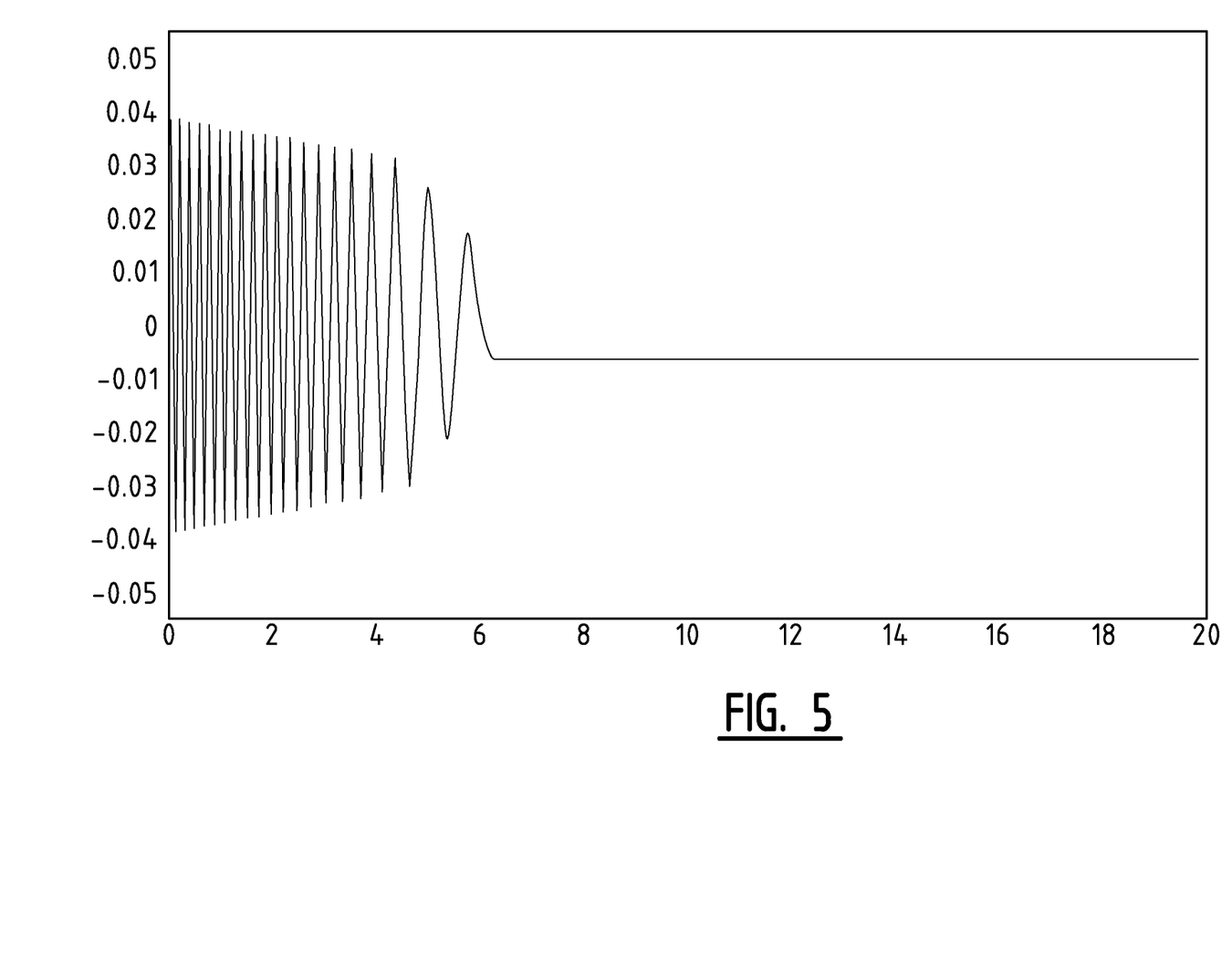
FIGS. 5 and 6 exhibit respectively a rotor displacement graph for rotational speed at an initial impact speed of 0.5 m/s and 2.8 m/s.
Figure 6:
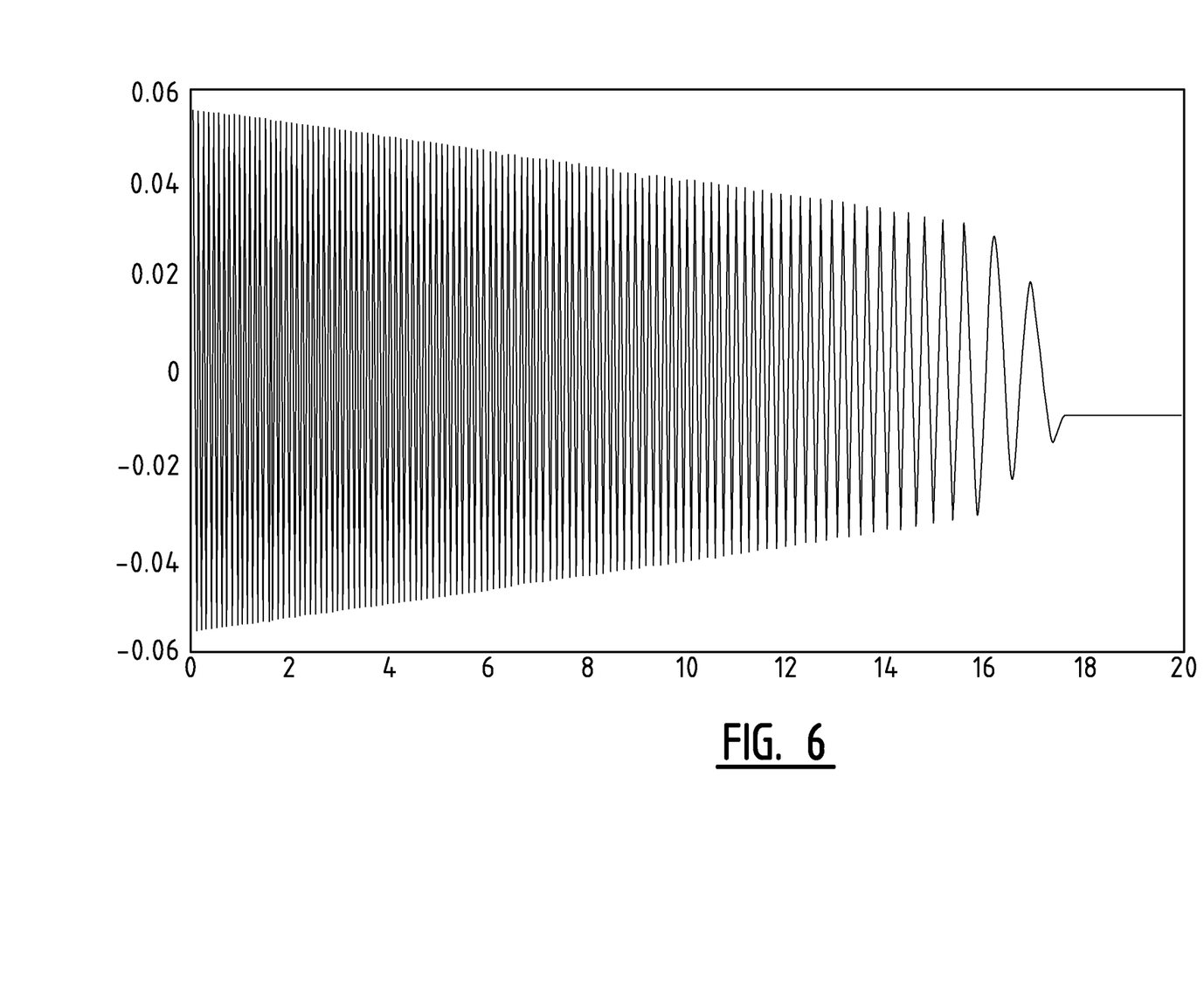

As substantiation of the effectiveness of the non-circular shape of the inner wall of casing 5, in particular though not exclusively by way of protrusions, according to the present disclosure, FIGS. 5 and 6 show damping in terms of rotor displacement in the direction of arrow A in FIG. 4, for respective initial rotational impact speeds of 0.5 m/s and 2.8 m/s. Clearly, a damping of radial displacement of the flywheel rotor 3 can be achieved in a matter of seconds, which is highly surprising in view of the dimensions of the enormous flywheel rotor, as mentioned above, and the very substantial rotation speeds the flywheel rotor 3.

The scope of the disclosure as a whole or that of the protection defined in the appended claims is by no means limited to any features explicitly described within the framework of the above embodiment description. Only the appended claim imposes such limitations, and allows for absence of a brake, alternatives for the shown brake as indicated above, other features than projections or protrusions to define the bumper deviating from the circular shape of the casing wall, for example the embodiments indicated at FIGS. 7 and/or 8, where even an oval shape of the casing wall is considered to comprise a bumper at the smaller diameter relative to the large oval diameter, et cetera.

The invention claimed is:

1. Flywheel system, comprising:
   a ring-shaped flywheel rotor, arranged on a rotation axis; and
   a substantially cylindrical casing, enveloping the flywheel rotor at least in a radial direction to contain the flywheel in case of a calamity,
   wherein the casing comprises at least one inward protruding bumper defining a variation from the circular shape in cross section of the casing wall surrounding the flywheel rotor.

2. Flywheel system according to claim 1, wherein the casing wall comprises at least two and preferably at least three inward protruding bumpers.

3. Flywheel system according to claim 2, wherein the inward protruding bumpers are uniformly distributed over the casing wall.

4. Flywheel according to claim 1, wherein the at least one inward protruding bumper is defined by a discontinuity in the tangential direction of the casing wall, deviating from a change in tangential direction of a circular shape.

5. Flywheel according to claim 1, wherein, in a rotational direction of the flywheel rotor and, the casing wall exhibits an approximately circular curvature with a radius, which is at least slightly larger than a radius of the flywheel rotor.

6. Flywheel according to claim 1, wherein the casing comprises reinforcement of the casing wall, preferably formed by a backing at the at least one inward protruding bumper.

7. Flywheel system according to claim 1, further comprising a brake, which is configured to, when activated, act on at least the flywheel rotor to slow down the flywheel rotor in case of emergency.

8. Flywheel system according to claim 1, wherein the casing wall comprises either a ring shaped or cylindrical wall or a disc shaped base, which is clamped with a degree of play in a concentric configuration with respect to the fly wheel, to absorb impact energy when the fly wheel impacts on the casing wall.

9. Flywheel system according to claim 8, wherein the at least one inward protruding bumper is omitted.

10. Flywheel system according to claim 1, wherein the at least one bumper comprises at least one straight plate arranged at a circle section relative to the circular shape of the casing wall, alongside an enveloping circular or cylindrical shape circumscribing the flywheel rotor.

11. Flywheel system according to claim 1, wherein the casing wall comprises at least one front plate, defining a deviation relative to the circular shape of the casing wall and an impact absorbing bumper.

12. Flywheel system according to claim 11, wherein the front plate is made of a softer material than that of the fly wheel and/or has a lower melting temperature than that of the fly wheel.

13. Fly wheel system according claim 11, wherein the front plate is coated with a friction reducing coating.

14. Flywheel system according to claim 1, wherein the casing wall comprises at least one bumper, comprising an assembly of plates.

15. Flywheel system according to claim 14, wherein the assembly comprises at least two of:
   a backing plate connected to or integral with the casing wall;
   a brass front plate;

a glass fibre layer; and
a base plate.

* * * * *